Jan. 6, 1959 C. D. McGILLEM ET AL 2,867,767

SIGNAL DETECTORS

Filed June 6, 1955

INVENTOR.
CLARE D. McGILLEM
ROBERT E. WILLIAMS

BY C. W. O'Brien
F. L. Styner
ATTYS.

United States Patent Office 2,867,767

Patented Jan. 6, 1959

2,867,767

SIGNAL DETECTORS

Clare D. McGillem, Indianapolis, and Robert E. Williams, Fort Wayne, Ind., assignors to Industrial Research Associates, Inc., Indianapolis, Ind., a corporation of Indiana Application June 6, 1955, Serial No. 513,620

4 Claims. (Cl. 324—78)

Figure 1:
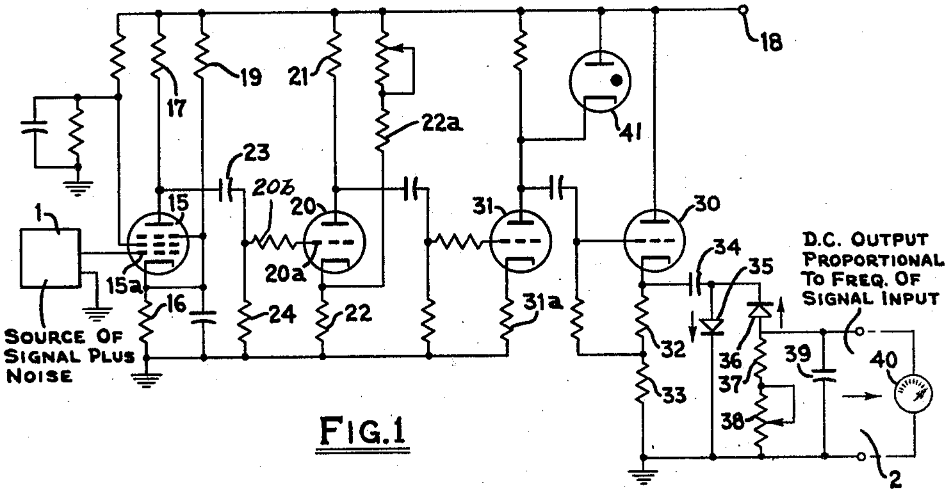

(Granted under Title 35, U. S. Code (1952), sec. 266)

The invention described herein may be manufactured and used by or for the Government of the United States of America for governmental purposes without the payment of any royalties thereon or therefor.

This invention relates to signal systems and is particularly directed to detector circuits of a type for reliably separating signals from noise. Whether information is transmitted via a radio carrier or via a wire conductor, with or without a high frequency carrier, the pulses are invariably confused with background noises. In pulse systems, for example, it is particularly important that voltage spikes of noise not be interpreted as wanted signal pulses. In some systems it is important that the leading or trailing edge of the pulse be distinctly defined for the sake of accurate time phase determinations, or for frequency measurement.

Frequency selective circuits for separating signal from noise are only partially effective because random noise usually contains components of frequency which will be accepted and confused with the wanted signals.

In accordance with the invention, incoming signal-noise pulses feed into a peak detector. Any positive portions of the pulses which exceed a predetermined minimum amplitude pass from the detector via a resistance-capacitance coupling network to the control grid of an amplifier having its steady-state cathode potential established below the plate-current cutoff level. The resistance-capacitance coupling circuit has a time constant longer than the longest interval between successive input pulses. As a result, successive input pulses cause the potential on the grid of the amplifier to fluctuate around a level more positive than the steady-state grid potential, high enough to cause plate-current conduction between peaks of the successive input pulses but are not high enough to prevent plate-current cutoff during the peak portions of the pulses passed by the detector. The amplifier, therefore, produces substantially noise-free, negative, square-wave output pulses having the same frequency as the input pulses.

The absence of noise content from the pulse output of the amplifier is attributable principally to the absorption or integrating capacity of the aforesaid coupling condenser. Any noise voltages intermixed with the negative-going pulses on the anode of the peak detector is of random occurrence and has substantially no effect on the average potential to which the condenser becomes charged. Furthermore, none of the negative-going pulses on the detector anode is conducted through the aforesaid amplifier because, as stated previously, they drive the grid potential below the level at which plate-current cutoff occurs.

It is apparent, therefore, that the invention provides a system responsive to the peaks of noise-bearing input pulses to produce noise-free output pulses having the same frequencies as the input pulses. Inasmuch as the intelligence content for the input pulses is represented in their frequency variations, the noise-free output pulses also contain the same intelligence.

The information content of the pulses may be rendered perceptible in many ways. In the embodiment disclosed herein, the noise-free output pulses pass from the amplifier through a cathode follower and thence to a resistance-capacitance differentiating network. From the differentiator the signals pass into an integrator which transforms them into a direct current potential having a magnitude representative of the pulse repetition frequency. Finally, the magnitude of the resultant direct current potential is rendered perceptible by transducing it into a pointer deflection on a suitable meter.

The object of this invention is improved means for effectively separating, and counting or integrating, undulatory signals from background noise. The "signals" contemplated here are of the type which undulate at any frequency within a preselected range and which may have a waveform of sinusoidal, rectangular, or other shape.

Figure 2:
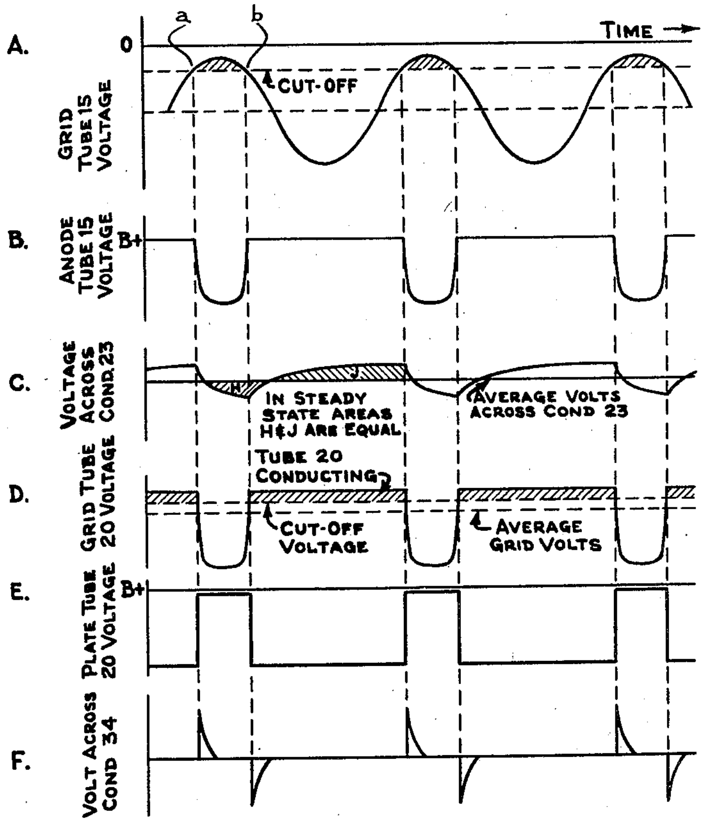

Other objects of this invention will become apparent when the embodiment is studied in the following specification and shown in the accompanying drawings in which:

Fig. 1 is a circuit diagram of the signal detector and integrator of this invention, and Fig. 2 shows the waveforms of the principal voltages of the circuits of Fig. 1.

For the purpose of this specification, the received signals to be detected are assumed to be demodulated and free of any carrier components but are assumed to be distorted and mixed with the usual noise voltages commonly encountered in amplifiers and transmission channels. The signals may have a sinusoidal, rectangular or other shape. The principal intelligence content of the signals will be in the repetition frequency of the undulations of the wanted signals. Such a signal source is shown diagrammatically at 1. In the description that follows means are shown for producing a direct current at the output terminals 2 that is analogous to the principal frequency of the received signal. According to this invention, random noise pulses will not be integrated with the wanted signal and will not falsely modify the direct current output at 2.

In Fig. 1 the amplified pulse signal with its noise content is applied first to the control grid 15*a* of amplifier 15. Amplifier 15 comprises a multi-grid tetrode or pentode. According to an important feature of this invention the cathode resistor 16 is placed in series with the amplifier, in addition to the anode load resistor 17. The anode load resistor is connected as usual between the anode and the high-voltage anode supply 18. Importantly in this invention, amplifier 15 is statically biased well beyond cut-off. For this purpose, the cathode of amplifier 15 may conveniently be biased with respect to the control grid by connecting the cathode to an intermediate point on the voltage divider made up of resistances 16 and 19 connected in series across the anode supply. The reasons for the cutoff bias will presently appear.

The second tube of the signal detector of this invention is the triode 20 connected, like the pentode, through anode resistor 21 and cathode resistor 22 between the high voltage source 18 and ground. And like the pentode, the cathode of triode 20 is statically biased beyond cut-off by tapping the cathode into the voltage divider comprised of series-connected resistors 22 and 22*a*. A grid current limiting resistor 20*b* is connected to grid 20*a*. The output of pentode 15 is taken, in the particular embodiment illustrated, at its anode and coupled through a relatively high capacity condenser 23 to the control grid 20*a* of triode 20. The grid side of condenser 23 is grounded through a resistor 24 having a relatively high ohmic value. The time constant of condenser 23 and resistor 24 is greater than the longest period between any two successive pulses of any expected series of signal pulses to be received by the detector.

Before proceeding with the description of the integrating circuit coupled to the anode of tube 20, attention will be directed to the operation of the coupling circuits between the two cut-off biased amplifiers. Reference will now be made to the waveforms of Fig. 2. The amplified input wave at the grid of tube 15 is shown at A in Fig. 2. Although the input wave is shown as sinusoidal it could have any desired undulatory shape. Tube 15 is biased substantially beyond cut-off so that all signals, both wanted and unwanted, applied to the control grid must be of substantial amplitude to carry the grid to conduction. Preferably, only the peak positive values of the signal between points *a* and *b* are passed by tube 15, as indicated in curve A of Fig. 2. The plate voltage of tube 15 remains at the high value of source 18 until conduction, whereupon the plate voltage drops sharply as indicated in curve B during conduction. The terminal of condenser 23 connected to the anode follows the anode voltage of tube 15, but the other terminal of condenser 23 lags behind changes of voltages on the anode of 15 so that the voltage across condenser 23 decays and increases exponentially as shown by curve C of Fig. 2. When the anode-terminal of condenser 23 dips, current flows upwardly in resistor 24, thus reducing the potential of the connected grid of tube 20. But when the anode-terminal of the condenser returns to no-load value, current flows in the opposite direction through resistor 24 and the grid of tube 20 is carried positively or upwardly. As indicated in the curve D of Fig. 2, tube 20 is biased and conducts only during intervals between the signals. In the steady state condition, after the input signal peaks become high and repeat for a considerable number of times, the charge on condenser 23 begins to fluctuate around an average value determined by the signal amplitude, the charge and discharge currents of condenser 23 become equal, and the area under the positive and negative excursions of the grid voltage of tube 20 becomes equal. The phase of the signals at the anode of triode 20 are of course inverted.

It is important to note that during the time the charge on condenser 23 is reaching said average value, the amplifier 20 remains blocked by its static bias. It is only after signals from amplifier 15 have persisted long enough to charge the coupling condenser 23 that the static cut-off bias of amplifier 20 is overcome.

Assume now that positive noise spikes coincide in time with the negative loop of the input signal on grid 15*a*. Such a spike cannot pass tube 15 unless the spike is opposite in polarity and equal in amplitude to the combined amplitudes of the fixed bias of tube 15 plus the amplitude of the negative loop of the signal. Such noise is easily eliminated by lowering as desired the static cutoff bias of tube 15.

Assume now that a noise spike coincides with the positive loop of the input signal. This means merely that the tube 15 is carried to greater conduction than without the noise spike and condenser 23 charges during one cycle to slightly higher value. But, unless the noise spike recurs during several successive positive loops of the signal, the average charge on condenser 23 and the average grid volts on tube 20 do not change. Hence, even if noise rides through tube 15, tube 20 is substantially insensitive to the worst of the noise spikes unless these noise spikes have a substantial frequency component equal to the signal frequency. Even more important is the fact that both amplifiers 15 and 20 remain cut off until signal pulses of a magnitude greater than cut off of tube 15 arrive and persist for a finite time. When the input signal is received from a moving target to be tracked, for example, the pulse detector of this invention remains passive and shows no indication of the target until the echo signal received from the target is well above the cut-off voltage of tube 15. Experience with circuits constructed in accordance with Fig. 1 indicates that when the tube 15 does respond to the signal, its response is positive, all accompanying noise voltages are eliminated in the coupled circuit 23—24, and the output of tube 20 remains unaffected until a finite time after receipt of the first signal. Since the static biases on tubes 15 and 20 are fixed in amplitude and the output of tube 20 registers a signal only upon receipt of input signals of predetermined minimum amplitude and repetition frequency, it matters not what the history of previous signals imposed upon the circuitry of tubes 15 and 20 may have been.

Amplifiers 30 and 31 are cascaded to the output of amplifier 20. The function of amplifier 30 with its immediately associated circuits is to reliably count and register the frequency of the output pulses of tube 20. Each amplifier 30 and 31 is connected between the B+ supply 18 and ground. Amplifier 31 has cathode bias resistor 31*a*, and amplifier 30 is in series with the cathode resistors 32 and 33. A differentiating circuit, including storage condenser 34 and rectifiers 35 and 36, are coupled in parallel with the cathode resistors 32 and 33. When the square wave output of tube 20 is amplified at 31 and applied to tube 30, the cathode potential of 30 follows the waveform of E, Fig. 2. Differentiating condenser 34 is of relatively small value so that its time constant is short compared to the duration of the pulses to be received. Therefore, the potential across condenser 34 decays rapidly after each change of potential of the cathode producing sharply defined spiked waveforms as shown in curve F of Fig. 2. Rectifier 35 is polarized so as to short to ground the spikes of one polarity while the rectifier 36 is oppositely polarized. The current through rectifier 36 produces a drop through load resistors 37 and 38 analogous to said oppositely polarized spikes. The condenser 39, or other integrating circuits, may be connected across load resistor 37 and 38 to integrate the areas under each of the spikes of one polarity.

A milliammeter 40, for example, may be connected across output terminals 2 and calibrated in terms of the frequency of the signal input to the system. Calibration of the utilization circuit such as a meter to reliably indicate the frequency of the input signal pulse at the grid of tube 15, is particularly easy with the amplifiers 15, 20, and 30 coupled as disclosed. By placing a voltage clamp such as gas tube 41 in the anode circuit of amplifier 31, the amplitudes of the spikes F, Fig. 2, at the cathode of tube 30 is reliably fixed, and the amplitude of the spikes are always the same regardless of signal amplitude to the grid 15. Further, the decay time of condenser 34 is easily predetermined and fixed by properly insulating and isolating the circuits surrounding condenser 34 and using rectifiers and resistors of stable resistance values. Hence, the areas under the spikes F, Fig. 2, are fixed and the meter or other utilization circuit always integrates the spikes of uniform area. This means that needle deflection would be a function only of frequency. If the calibration of the meter changes because of environmental variations, adjustment of resistance 38 quickly and easily returns the meter to its proper calibration.

This invention is particularly useful in conventional radar systems where the time of travel of a pulse of microwave energy to and from a target must be accurately measured, and where disturbance of the pulse wave front may cause serious error in the measurement of range. Or this invention could be used to advantage in systems where direct current pulses are produced by radiating continuous microwave energy from a directional antenna and where the echo signal is received at the antenna and combined directly with a small portion of the locally produced continuous wave energy thereby developing a resultant beat-frequency signal dependent upon the relative phase of the two waves. Here, changes of range to the reflecting target produces the well known Doppler effect. The Doppler wave may be rectified, squared, if desired, and employed in the manner of the pulses from the core conventional pulse radar. Through the application of this invention either the pulse or Doppler radar system is made particularly useful in measuring target movement because the desired output pulses can be distinctly separated from noise voltages. Thus troublesome spikes of noise voltage are effectively eliminated from the wanted signals.

According to this invention, pulses in a substantial noise background are reliably isolated without filter circuits and are reliably integrated to produce a quantity representative of the repetition frequency of the pulses. Many modifications may be made in this invention without departing from the spirit of the invention as exemplified in the above described embodiment and defined in the appended claims.

What is claimed is:

1. A pulse measuring system comprising: first, second, and third grid-controlled amplifiers coupled in cascade between a source of intermixed noise and pulse signals and a pulse utilization circuit, each of said amplifiers having at least an anode, a grid, and a cathode; means establishing the grid-cathode potentials of the said first and second amplifiers at a potential below plate-current cutoff; a coupling condenser connected between the anode of the first amplifier and the control grid of the second amplifier; a grid-leak resistor connected between the grid side of the said condenser and a source of constant potential such as ground to form a resistance-capacitance network having a time constant greater than the longest period between two successive pulses of the said pulse signals, such that the said control grid of the second amplifier will be driven above the cutoff potential only after integration of a plurality of pulses passed by the first amplifier; a differentiating circuit coupled to the output of the third amplifier; and a rectifier coupled between said utilization circuit and the said differentiating circuit for developing a direct-current potential having a magnitude representative of the repetition frequency of the said pulse signals.

2. A pulse system comprising: a source of regularly recurring signal pulses intermixed with random noise pulses having amplitudes greater than the said pulse signals, said pulse signals having a predetermined range of pulse repetition rates; a first amplifier coupled to the said source; a second amplifier, each of said amplifiers having a control grid, a cathode, and an anode; means statically biasing the respective cathodes of the said first and second amplifiers at a potential below plate-current cutoff; a resistance-capacitance network coupling the anode of the said first amplifier with the input grid of the said second amplifier, the said resistance-capacitance network having a time constant greater than the longest period between two successive pulses of said pulse signals but shorter than the normal period of recurrence between the said random noise pulses; means coupling the anode of said second amplifier through a network to a utilization circuit; and a differentiating network coupled in said network to said utilization circuit, whereby noise free pulses are provided to said utilization circuit, said noise free pulses having the same frequency as said regularly recurring signal pulses.

3. In combination, a source of regularly recurring signal pulses mixed with random spikes of noise voltage having amplitudes greater than that of said signal pulses and a detector coupled to the said source responsive to the said signal pulses but substantially unresponsive to the said noise voltage spikes, the detector comprising: two cascaded amplifier tubes having control grids; means biasing the cathode of the second of said tubes at a potential below plate-current cutoff; an integrating condenser coupled between the output of the first of said tubes and the input of the other, the said condenser having a capacitance large enough to require a plurality of signal pulses to increase the grid-cathode potential of the second of the said tubes to a level where plate-current conduction occurs; a current limiting resistor connected between said condenser and the input of said second tube; and a grid leak resistor connected between a source of constant potential, such as ground, and the common junction between said condenser and said current limiting resistor.

4. In combination: a source of undulatory signals variable through a predetermined range of frequency including random noise impulses of relatively high amplitude; a first amplifier tube coupled to the said source, means biasing the said first tube to pass only peak portions of the said signals and noise impulses; a storage condenser having a charging time greater than the longest period between two successive undulations of the said signals coupled to integrate the signal and noise output of the said first amplifier tube; a second amplifier tube having an input circuit coupled to the said storage condenser; an output circuit coupled to said second amplifier tube; means biasing the said second tube at a potential below plate-current cutoff, such that conduction occurs in the said second amplifier tube only after a series of said peak portions has been integrated by the said storage condenser to increase its potential to a level where the said second amplifier tube conducts during the intervals between the said peak portions but remains cut off during the said peak portions; a utilization circuit coupled to the output of said second amplifier; a voltage clamp coupled to the second amplifier output circuit to establish the amplitude of all pulses passed by said second amplifier tube at a fixed level; and means coupled between said second amplifier and said utilization circuit for differentiating and rectifying the differentiated pulses to pass to said utilization circuit only rectified decay pulses of fixed dimensions.

References Cited in the file of this patent

UNITED STATES PATENTS

| | | |
|---|---|---|
| 2,467,777 | Rajchman | Apr. 19, 1949 |
| 2,597,870 | Jensen | May 21, 1952 |